Figure 1:
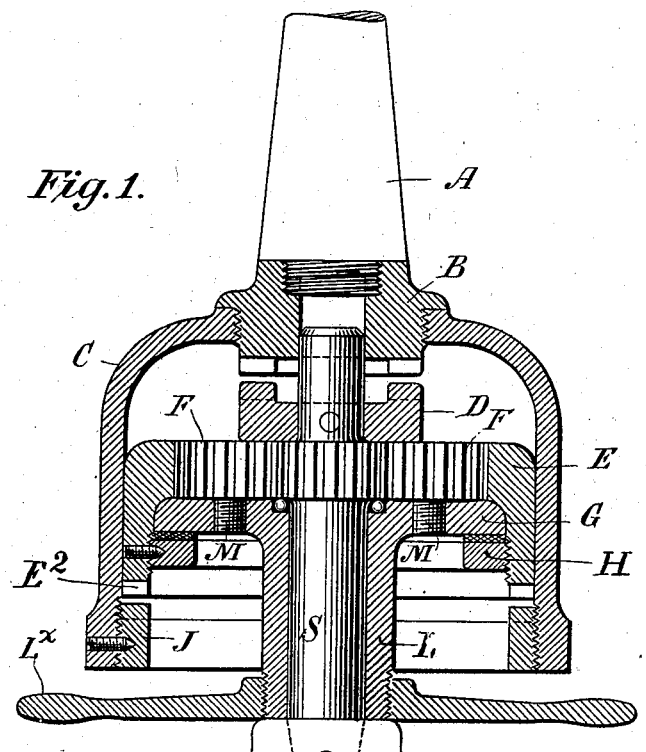
Figure 2:
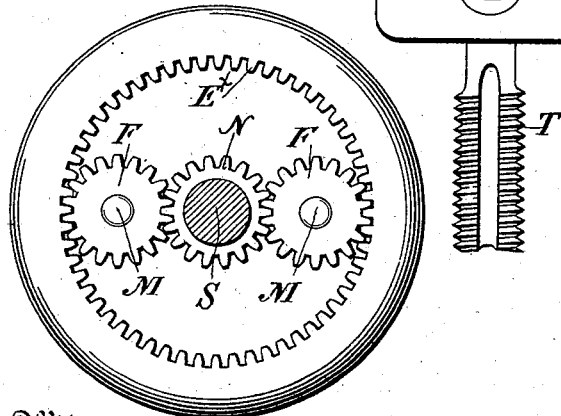
Figure 3:
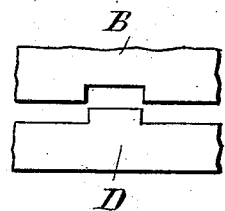

No. 708,748. Patented Sept. 9, 1902.
H. WHARTON.
REVERSING TAP HOLDER.
(Application filed May 19, 1902.)
(No Model.)

Witnesses
C. E. Ashley
Gro. C. Henning.

Inventor
Harry Wharton
By his Attorney
Richard W. Barkley.

THE NORRIS PETERS CO., PHOTO-LITHO., WASHINGTON, D. C.

UNITED STATES PATENT OFFICE.

HARRY WHARTON, OF LOUGHBOROUGH, ENGLAND.

REVERSING TAP-HOLDER.

SPECIFICATION forming part of Letters Patent No. 708,748, dated September 9, 1902.

Application filed May 19, 1902. Serial No. 107,927. (No model.)

*To all whom it may concern:*

Be it known that I, HARRY WHARTON, a subject of the King of England, and a resident of Loughborough, in the county of Leicester, England, have invented a certain new and useful Improvement in Reversing Tap-Holders, of which the following is a specification.

The present invention relates to reversing tap-holders or tap-heads adapted to be used with the spindles of tapping and other machines, and has for its primary object the provision of means whereby upon the arrest or reversal of the endwise motion of the main spindle of the machine the tap will presently be stopped automatically and will then upon the arrest of a rotatory gear-carrier mounted on the tap-holder or its spindle have its own direction of rotation reversed and by preference will rotate in such reversed direction at a greater rate of speed than it has in its working direction of rotation.

The present invention consists of features of construction, devices, and combinations hereinafter described, and more particularly pointed out in the appended claims.

The preferred form of the invention is illustrated in the accompanying drawing, forming part hereof, in which—

The reference A indicates the main spindle or shank of the machine, B one member of a clutch which is fast upon the spindle A, and C a cylindrical casing or bell which is open at one end (the lower) and is fast upon the part B, said casing or bell being concentric with the shank A.

S designates a tap-holder spindle, of suitable form or make, which is arranged axially in line with the spindle A and has a bearing in the member B, whereby it may turn and move endwise quite independently of the shank A and member B unless connected with clutch member B, as hereinafter described.

The reference D indicates a clutch member fast upon or integral with the spindle S and adapted to coact with the clutch member B to connect the shafts A and S to cause the first to drive the second direct.

Reference K designates a tap-chuck fast upon the spindle S and in which the tap is held fast in any suitable way or manner.

L indicates a sleeve on and loose relative to the shaft S, which sleeve L is provided with a lever or hand-wheel L$^\times$, whereby it may be held against motion of rotation at any time. The sleeve L abuts against the tap-holder K and a gear N, which is fast upon or integral with the spindle S. The sleeve L is provided at its upper end with a flange G, which rests upon a ring H, attached by screws or otherwise to an annulus E. The said annulus fits within the bell or casing C, being free to move independently thereof, and at its upper end is provided with an inside flange E$^\times$, which overlies the flange G and which is provided with teeth in the plane of the teeth of said gear N. Two or more pinions F, revolving on pins M, fixed to the flange G, are disposed symmetrically about the axis of the shaft or spindle S and mesh with the gear N and the internal gear E$^\times$. The lower edge of the annulus E is formed or provided with one member E$^2$ of a clutch, and the bell or casing C has a ring J secured thereto, which is provided with the other member of said clutch, whereby the casing C and annulus E may be connected, so as to cause the casing to drive the annulus with it in certain positions of the latter. The ring J also prevents the annulus and parts connected therewith from falling out of the casing. Suitable antifriction devices may be inserted between the flange G, the ring H, and the gear N.

The operation is as follows: The shaft or spindle A is driven in but one direction and is raised and lowered in any suitable manner, as usual in machines wherein the present invention is useful. The weight of the parts causes the unsupported spindle S to drop down, and thereby disengage the clutch D B, which remains disengaged until the descending tap is arrested by the work, and the further descent of spindle A causes said clutch to reëngage the spindles A and S. The spindle A is rotating, as will be understood, and therefore drives the tap directly through the spindle S. During this time the casing C, annulus E, sleeve L, flange G, and parts carried thereby are all idle, as will be understood. Upon the arrest of the downward motion of the main spindle A, whether this be automatically accomplished or otherwise, the clutch D B drives the tap until further downward motion of the spindle S causes the disengagement of that clutch, whereupon of course the tap stops. To reverse the motion of the tap, and thereby withdraw it from the hole, the shaft A is raised, carrying with it, of course, the clutch member B, casing C, and clutch-ring J, while the tap by its engagement with the hole prevents the shaft S, annulus E, and sleeve from moving upward. At the same time an attendant grasps the lever of hand-wheel on the sleeve L and holds that sleeve against rotation, thereby stopping the motion of translation of the gears F. As soon as the clutch J $E^2$ becomes engaged through the upward motion of the casing and the standing still of the annulus E the annulus and its gear $E^\times$ rotate with the casing C and the spindle A, and thereby drive the spindle S through the gears F N in a direction the reverse of that in which the spindle A drives the spindle S through the clutch B D, whereby the tap is withdrawn from the hole at a rate of speed dependent on the ratio of the gearing $E^\times$ F N and which is higher than that at which the spindle S is driven when connected directly with the spindle A, or in case the lever $L^\times$ is permanently held stationary the operation is as follows: Assuming that the tap is out of contact with the work and that everything is in readiness, the spindle A is lowered and the clutch B D is engaged when the tap strikes the work. During the operation of tapping the tap is driven direct by the spindle A through the clutch B D and the shaft or spindle S, while the annulus E is rotated from the pinion N through the intermediates F. When it is desired to reverse the direction of rotation of the tap, the spindle A is raised, thereby disengaging the clutch D B and thereafter engaging the members of the said clutch J $E^2$, whereupon the motion of the casing C is transmitted to the tap in the manner hereinbefore described. The lever $L^\times$ may be held in any suitable manner, as will be understood. The symmetrical disposition of the gears F about the axis of the spindles balances the pressures, and so reduces the resistance to a minimum, whereby but little force is required to hold the sleeve L stationary during the reverse motion of the tap. The employment of independent clutches for the driving and the reverse motions of the tap prolongs the life of the parts.

Having thus fully and clearly described my invention and the best manner in which I have contemplated carrying the same into effect, what I claim as new, and desire to secure by Letters Patent of the United States, is—

1. The combination of a main spindle or shank, a bell or casing attached thereto, a clutch member within said casing or bell, a second spindle or shank in line with the first and movable independently thereof, a clutch member on the second shank adapted to coact with the first-named clutch member to connect the spindles or shanks directly, an independently-movable annulus within said casing or bell, a clutch for connecting casing and annulus, gears interposed between and connecting said annulus and the second-named shank or spindle, and means whereby certain of said interposed gears may be held against motion of translation.

2. The combination of a rotary main spindle or shank, a bell or casing fast thereto, a second spindle in line with the first-named spindle and movable independently thereof, a clutch within said casing or bell for connecting said spindles to drive the second directly from the first, a reverse-motion gearing independent of said casing or bell, a clutch for connecting said gearing and said casing to drive one member of said gearing from said casing, and means whereby part of said gearing may be held against motion of translation, substantially as described.

3. The combination of alined independently-revoluble spindles or shanks, two clutch members rigidly connected with the driver shank or spindle, a clutch member and a gear attached to the second shank or spindle, a rotatory internal gear having a clutch member, gears interposed between and meshing with said spindle-gear and said internal gear, and a rotatory carrier for the interposed gears, said carrier being capable of being stopped at any time.

4. The combination of a main spindle, a casing or shell attached thereto, a clutch member within said casing, a tap-spindle axially in line with the main spindle and movable independently thereof, a clutch member on said tap-spindle adapted to engage with the first-named clutch member to connect said spindles directly, an independently-movable toothed annulus within the casing or shell, an independent clutch for connecting said casing and said annulus, a sleeve surrounding the tap-spindle, a pinion on the tap-spindle, and pinions carried by said sleeve and meshing with the tap-pinion and the toothed annulus, substantially as described.

5. The combination of a main spindle, a casing or shell attached thereto, a tap-spindle axially in line with the main spindle and movable independently thereof, a pinion fast on the tap-spindle, a clutch within the casing for connecting said spindles directly, a sleeve on the tap-spindle, a flange on said sleeve underneath the pinion on the tap-spindle, an annulus within the casing and movable independently thereof, an internally-toothed ring on said annulus, pinions meshing with said toothed ring and the tap-spindle pinion, and a clutch at the mouth of the casing or shell for connecting the annulus and casing when the first-mentioned clutch is disengaged, substantially as described.

Signed at Loughborough, in the county of Leicester, England, this 25th day of March, A. D. 1902.

HARRY WHARTON.

Witnesses:
G. W. SMITH,
P. G. RIDSARD.